United States Patent [19]

Briggs et al.

[11] Patent Number: 5,325,820
[45] Date of Patent: Jul. 5, 1994

[54] POULTRY HARVESTER

[75] Inventors: Douglas V. Briggs; George C. Stevens, both of Northwood, N.H.

[73] Assignee: American Calan, Inc., Northwood, N.H.

[21] Appl. No.: 961,173

[22] Filed: Oct. 14, 1992

[51] Int. Cl.[5] ............................................. A01K 29/00
[52] U.S. Cl. ...................................................... 119/846
[58] Field of Search ............................................ 119/82

[56] References Cited

U.S. PATENT DOCUMENTS

| | | | |
|---|---|---|---|
| 3,921,588 | 11/1975 | Ledwell, Jr. | 119/82 |
| 3,958,536 | 5/1976 | Crowder | 119/846 |
| 4,201,156 | 5/1980 | Kähler | 119/82 |
| 4,508,062 | 4/1985 | Berry et al. | 119/82 |
| 4,513,689 | 4/1985 | Berry et al. | 119/82 |
| 4,669,423 | 6/1987 | van den Brink | 119/82 |
| 4,766,850 | 8/1988 | O'Neill | 119/82 |
| 4,900,292 | 2/1990 | Berry et al. | 474/84 |
| 5,101,767 | 4/1992 | Williams et al. | 119/82 |

FOREIGN PATENT DOCUMENTS 2205917A  12/1988  United Kingdom .

OTHER PUBLICATIONS

No. 9106534.2, Poultry-Handling Assembly, dated Mar. 27, 1991 pp. 1-5 with one sheet of drawings.
No. 9022574.9, Poultry-Handling Assembly, dated Oct. 17, 1990, cover page and pp. 1-13 with five sheets of drawings.
Martha Middleton, Chicken-pickin', the easy way, The Concord Monitor, Concord, N.H., pp. D1 and D3, Circa. 1990.
Automatic Chicken Catcher, Agritec, pp. 1-7, Circa. 1990, United Kingdom.

*Primary Examiner*—Robert P. Swiatek
*Attorney, Agent, or Firm*—Senniger, Powers, Leavitt & Roedel

[57] ABSTRACT

A poultry harvester capable of capturing poultry on a generally horizontal plane, such as the floor of a poultry house, and transferring a predetermined number of captured poultry to a compartment of a cage having a plurality of compartments. A capturing mechanism captures the poultry and provides it to a conveying mechanism for conveying the captured poultry. A counting mechanism counts the captured poultry. A depositing mechanism deposits the conveyed poultry into each of the compartments of the cage under the control of a CPU responsive to the counting mechanism. The CPU controls the depositing mechanism to deposit in each of the compartments the predetermined number of poultry as counted by the counting mechanism. A method for harvesting poultry is also disclosed.

22 Claims, 12 Drawing Sheets

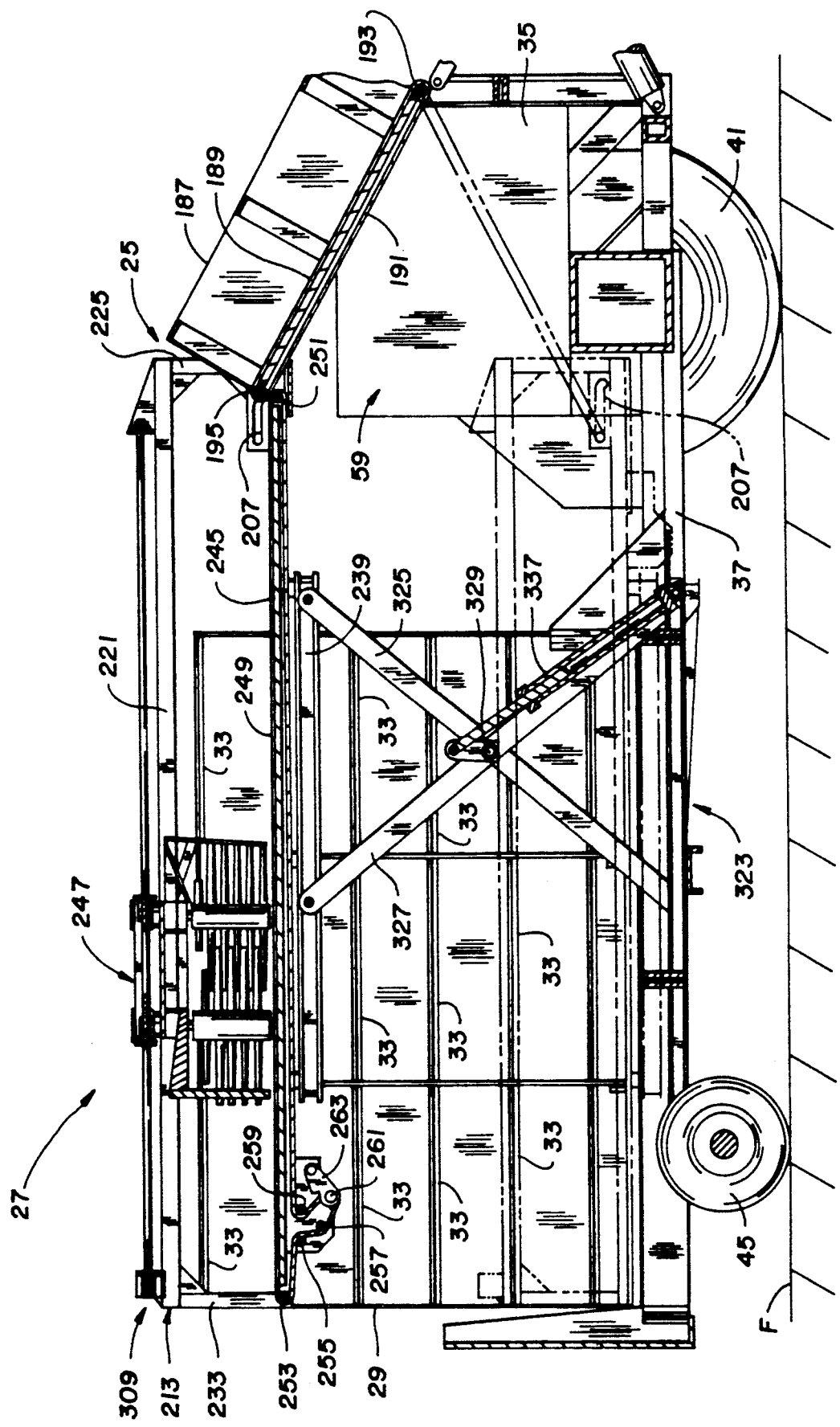

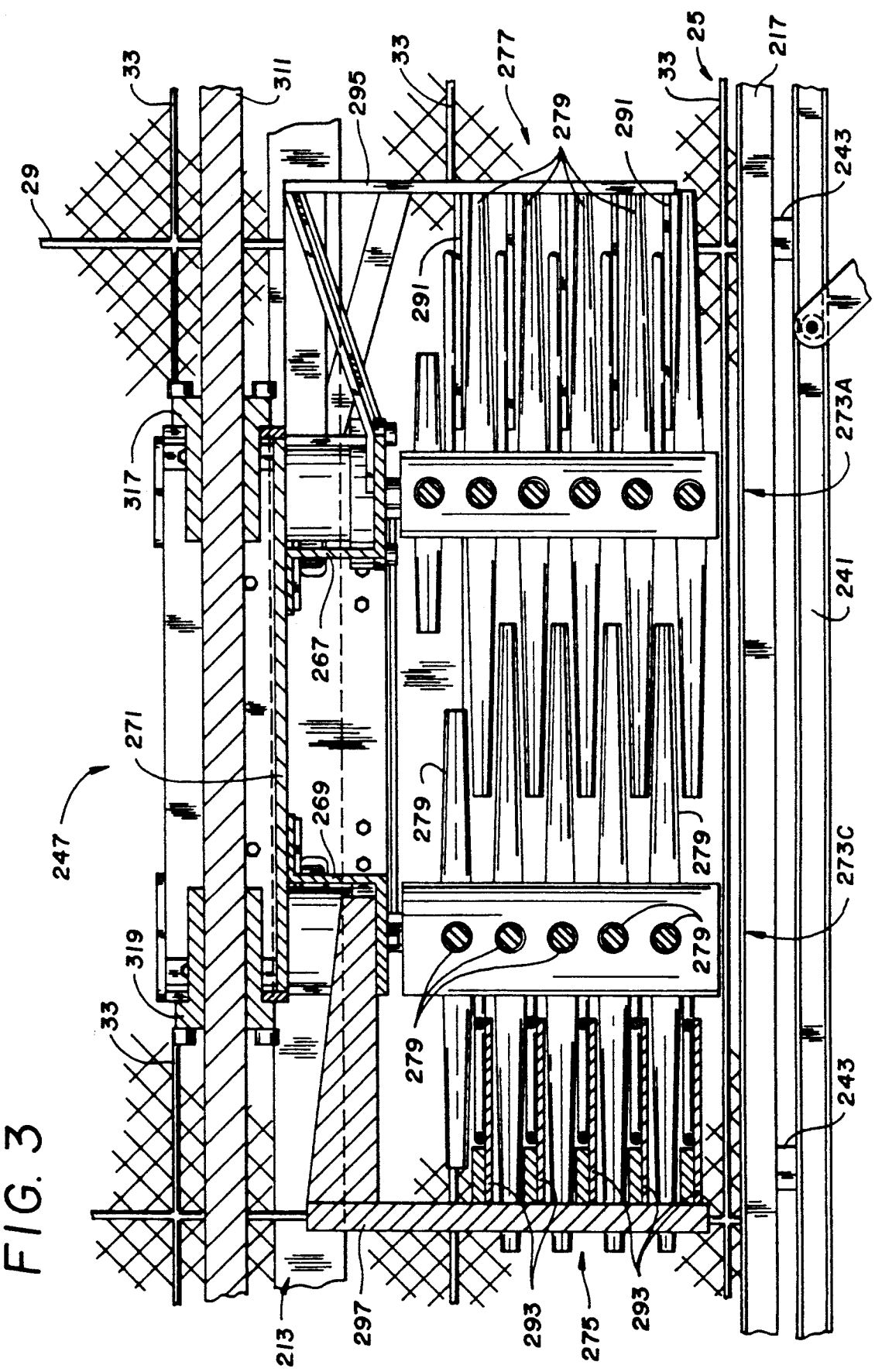

POULTRY HARVESTER

BRIEF SUMMARY OF THE INVENTION

This invention relates generally to poultry harvesting devices and more particularly to a harvesting device capable of capturing live poultry, such as chickens, and transferring the captured poultry to a compartment of a cage.

In the poultry industry, poultry is raised in poultry rearing houses having large enclosed areas where the poultry is allowed to run free. A standard poultry cage typically has either fifteen or eighteen compartments arranged in rows and columns, such that there are three compartments in a row and five or six tiers. Each compartment has a door blocking the entrance into the compartment which must be opened before depositing poultry into the cage and closed thereafter to prevent their exit therefrom. This procedure of capturing and caging the Poultry is called harvesting in which the caged poultry is then shipped to processing plants for slaughter.

Presently, when the poultry meets market weight, a large catching crew captures and cages the poultry on a manual basis. However, there are poultry harvesting devices which are capable of capturing the poultry so that they may be manually deposited in compartments provided in the cages. Such a harvesting device is shown in U.S. Pat. No. 4,508,062 which discloses a harvester suited for maneuvering the tractor on the floor of the poultry house. The harvesting device further includes two rotors located at the front of the harvester which interact to capture poultry off the floor of the poultry house. Each rotor has a plurality of flexible rubber guide members which cooperate with the guide members of the other rotor to gently capture the poultry and deliver them to a conveyor located rearwardly from the rotors. As disclosed in U.S. Pat. No. 4,508,062, the poultry is then manually deposited into compartments of the cage. Before depositing the poultry in the cage, the person depositing them must also count the poultry so that a predetermined number of poultry enters the cage.

Many factors make the aforementioned apparatus and method of depositing poultry from the conveyor into the compartment of the cage undesirable. For instance, conditions in the poultry house make it unhealthy for individuals to work in the house for sustained periods of time. Moreover, the harvesting usually requires strenuous activity and takes place at night because the poultry is more docile at night time than during the day. Attempting to capture and cage the poultry during the day when they are more excitable may cause bruising of the poultry meat resulting in down grading of the carcass. Also, an inordinate number of people (e.g., seven) are required to deposit and count the poultry and maintain an acceptable rate of poultry caged per hour.

Accordingly, among the several objectives of the present invention include the provision of an automated poultry harvester which is capable of depositing a predetermined number of poultry directly into a compartment of a cage substantially reducing manual labor requirements; the provision of such a poultry harvester which accurately counts the poultry so that only the predetermined number of poultry is deposited into a compartment; the provision of such a poultry harvester which is capable of capturing and depositing a large number of poultry in cages; the provision of such a poultry harvester which reduces the potential of bruising the poultry and thereby increasing its market value; and the provision of such a poultry harvester which is easy to operate.

In general, a poultry harvester of the present invention is capable of capturing poultry on a generally horizontal plane, such as the floor of a poultry house, and transferring a predetermined number of captured poultry to a compartment of a cage having a plurality of compartments. The poultry harvester comprises means for capturing the poultry, means for conveying the captured poultry, means for counting the captured poultry, and means for depositing the conveyed poultry into each of the compartments of the cage. The harvester also comprises means, responsive to the counting means, for controlling the depositing means to deposit in each of the compartments the predetermined number of poultry as counted by the counting means.

Other objects and features will be in part apparent and in part pointed out hereinafter.

BRIEF DESCRIPTION OF THE DRAWINGS

FIG. 2B is a partial elevational cross-sectional view taken along line 2—2 in FIG. 1 of the left portion of the harvester;

FIG. 3 is a partial elevational cross-sectional view taken along line 3—3 in FIG. 1;

Corresponding reference characters indicate corresponding parts throughout the several views of the drawings.

DETAILED DESCRIPTION OF THE PREFERRED EMBODIMENT

Figure 1:
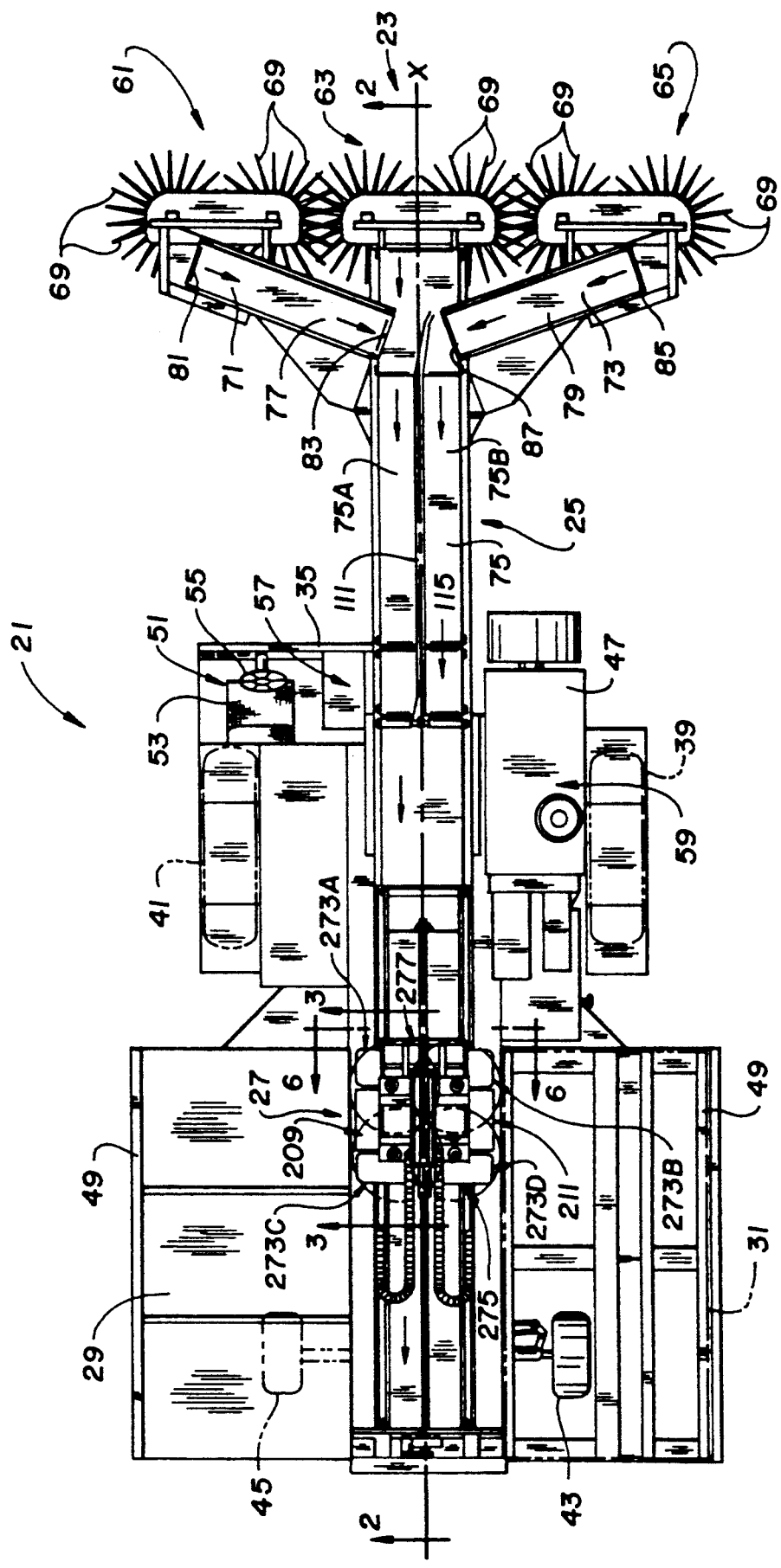
FIG. 1 is a top plan view of a poultry harvester of the present invention capable of depositing poultry into a compartment of a cage.

Referring now to the drawings, there is indicated generally at 21 a poultry harvester of the present invention including a capturing mechanism indicated generally at 23 for capturing live poultry (not shown) off the floor F of a poultry house (see FIG. 2), and a conveying mechanism indicated generally at 25 which conveys the captured poultry to a depositing mechanism indicated generally at 27. The depositing mechanism 27 deposits the conveyed poultry into either cage 29 on one side of the rear of the harvester and or cage 31 (shown in phantom), identical to cage 29, on the other side of the rear of the harvester 21. As is well known in the poultry industry, each poultry cage has fifteen or eighteen compartments 33 (see FIG. 2B) arranged in rows and columns such that there are three compartments in a row and five or six tiers in each column. Cage 29 is shown in FIG. 2B for illustration purposes as having eighteen compartments 33. However, it is to be understood that the depositing mechanism is capable of delivering poultry to cages having compartments arranged in various configurations.

As is well known in the poultry industry, young poultry is contained in the poultry house until they reach slaughter weight, after which they are harvested for shipping to processing plants. The harvesting should take place during darkness, preferably at night time, due to the poultry being more docile during darkness. Harvesting the poultry at night reduces the likelihood of bruising the poultry. The poultry is allowed to run free on the floor F of the house. The poultry harvester 21 includes a chassis 37 to support the capturing, conveying and depositing mechanisms, along with the cages. The chassis 37 is supported by four wheels. Two relatively large front wheels 39, 41 are located generally forwardly of the harvester 21 and mounted on the chassis 37 via an axle extending across the width of the harvester 21 for powering the movement of the harvester. Two relatively smaller rear wheels 43, 45 are located rearwardly of the harvester 21 and mounted on the chassis 37 for steering the harvester. This wheel arrangement provides the harvester 21 with maximum maneuverability within the poultry house, it is capable of turning within a relatively small radius. The harvester 21 further includes an engine 47, such as a four cylinder, 80 horsepower diesel engine, such as manufactured by John Deere, for powering the front wheels 39, 41 of the harvester 21. This engine 47 also powers a hydraulic system (described below) which operates mechanisms 23, 25 and 27. The harvester further includes a transmission (not shown) which allows the harvester to move forwardly at slow speeds while still having sufficient torque to be able to go over any obstacles on the floor F of the poultry house (e.g., poultry feces).

The cages 29, 31 are supported at the rear of the harvester 21 by two support platforms 49 pivotally attached to the chassis 37. The platforms 49 pivot between a generally horizontal position in which they are able to support a cage 29, 31 and a generally vertical stowed position (not shown) in which they fold upwardly to reduce the width of the harvester during transport.

An operator station indicated generally at 51 is further provided which allows a person to operate the harvester. The operator station 51 includes a seat 53 for the operator and a number of controls (e.g., a steering wheel 55, components for controlling the engine, pressure gages for the hydraulic system and the like) for operating the harvester. Also provided in the operator station 51 is a central processing unit or CPU ("controlling means") indicated generally at 57 which allows the operator to control the operation of the harvester. More specifically, the CPU 57 controls the sequence of operation of the capturing, conveying and depositing mechanisms which will be described in detail hereinafter.

A hydraulic system is provided for accommodating various hydraulic drive motors present in the harvester. The system comprises four hydraulic pumps generally indicated at 59 located on the side of the harvester opposite the operator station. Hydraulic lines carrying pressurized fluid connect the hydraulic pumps and various hydraulic motors.

Figure 2A:
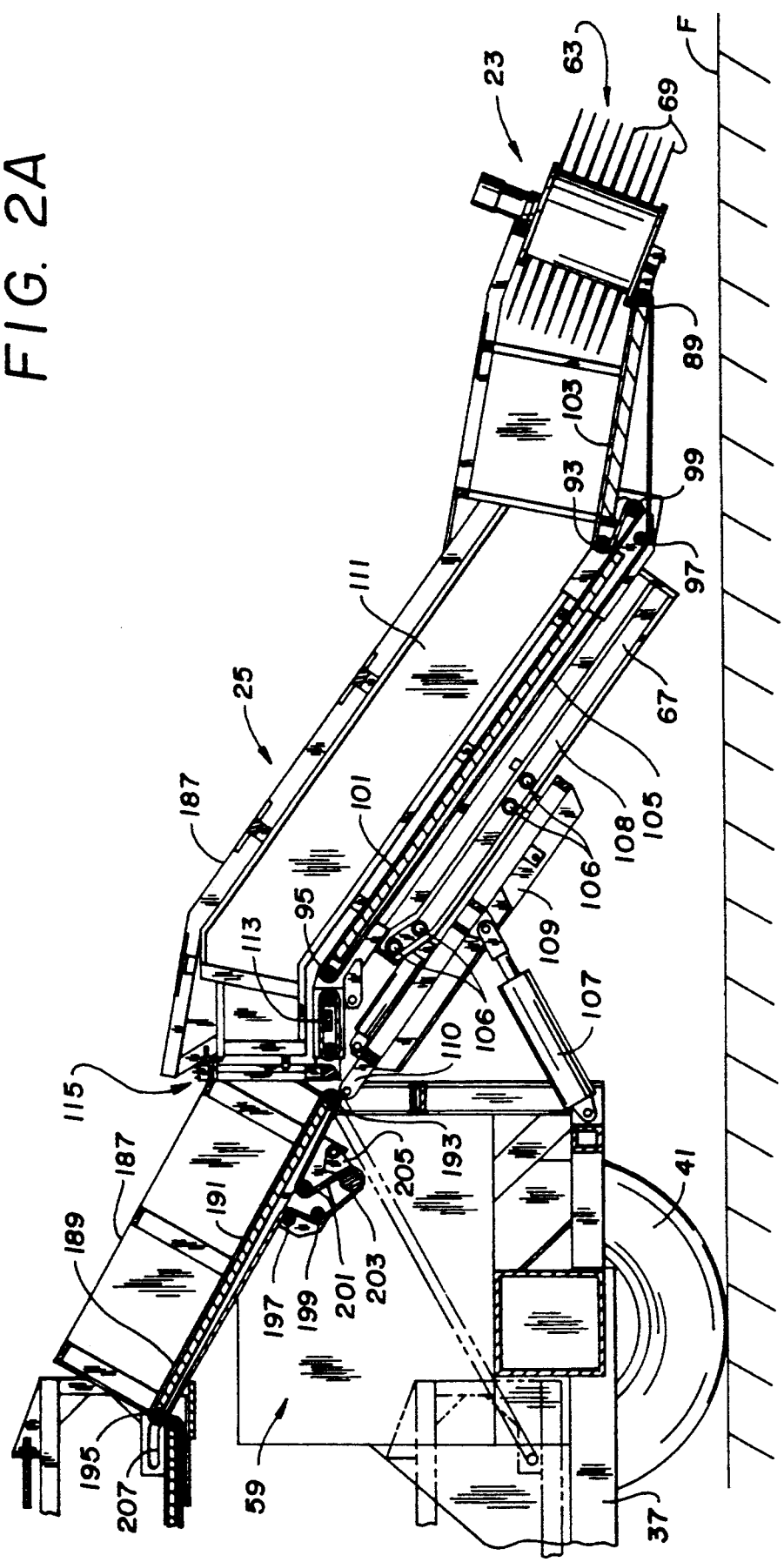
FIG. 2A is a partial elevational cross-sectional view taken along line 2—2 in FIG. 1 of the right portion of the harvester.

FIGS. 1 and 2A illustrate at the forward most end of the harvester 21 the capturing mechanism 23 which captures the poultry and delivers them to the conveying mechanism 25. The operation of capturing mechanism 23 is generally the same as the poultry capturing assembly disclosed in U.S. Pat. No. 4,508,062, incorporated herein by reference, and will be described only generally herein. The capturing mechanism 23 is provided with three pairs of rotors, indicated generally at 61, 63 and 65, which provide a wide area across which the poultry harvester may capture poultry. As shown in FIG. 2A, the capturing area is substantially the same width as the width of the poultry harvester at its widest point. The three pair of rotors 61, 63, 65 are supported by a forward frame member 67 which is mounted at the front end of the harvester 21. Each pair of rotors are arranged side-by-side with each of the rotors rotating about generally vertical axes so that poultry is captured between the rotors. The tops of the rotors are forwardly cantered so that captured poultry are lifted onto the conveying mechanism. Each rotor has a continuous array of flexible, radially extending guide elements 69 which cooperate with the guide elements of the other rotor to capture and lift the poultry.

The rotors 61, 65 discharge the captured poultry onto two side conveyors 71, 73 which lead to a primary conveyor 75 located between the side conveyors and centrally along a longitudinal axis X of the harvester 21. The two side conveyors 71, 73 are oriented generally transverse to the axis X of the harvester 21 and having interior ends aligned rearwardly as viewed in FIG. 1. Conveyors 71, 73 include belts 77, 79 which move as indicated by the arrows thereon over rollers 81, 83 and 85, 87, respectively, at either end of the conveyors. Each belt is driven by a hydraulic drive (not shown). Rotors 61 and 65 discharge captured poultry onto side conveyors 71 and 73, respectively, which in turn convey the poultry to the primary conveyor 75. Rotors 63 discharge captured poultry directly onto the primary conveyor 75 without the aid of a side conveyor.

The primary conveyor 75 comprises a series of freewheeling rollers 89, 95, 97, 99 and a drive roller 93 driven by one of the hydraulic pumps 59 for moving a belt 101 in a direction as shown by the arrows thereon and at a rate of speed comparable to the rate of speed of the side conveyors 71, 73. As a result, captured poultry moves from the forward end of the primary conveyor 75 near the capturing mechanism towards the rear of the harvester 21. As shown in FIG. 2A, a first portion 103 of the primary conveyor 75 angles slightly upwardly having its rearward end overlapping and conveying captured poultry onto a second portion 105 more steeply angled than the first portion 103. The angle of the second portion 105 relative the horizontal plane may be varied by a hydraulic piston 107 having one of its ends pivotally attached to the chassis 37 and its other end pivotally attached to a conveyor support frame 109. The support frame 109 is also Pivotally attached at one end 110 to the chassis 37. As shown, the forward frame member 67 is connected to frame 109 by a series of cam followers 106 attached to the support frame 109 and located in channels 108 formed in the forward frame member 67. This arrangement allows the forward frame member 67 to retract rearwardly (i.e., back towards the main body of the harvester) in which the piston 107 raises the capturing mechanism 23 such that the primary conveyor 75 and side conveyors 71, 73 are above the remaining portions of the conveying mechanism 25 in a travel position. Piston 107 controls the position of the capturing mechanism 23 relative to floor F so that the front end is raised to its travel position in which the harvester 21 may be loaded on a trailer.

The primary conveyor 75 has a partition 111 located centrally along the length of the conveyor colinear with axis X. As shown in FIG. 1, poultry captured by rotor pairs 61, 63 travel on side 75A of the conveyor 75, and poultry captured by rotor pair 65 travel on the other side 75B of the conveyor. The partition 111 is provided so that captured poultry are forced into a single file to facilitate counting, which will be described in greater detail below.

Figure 8:
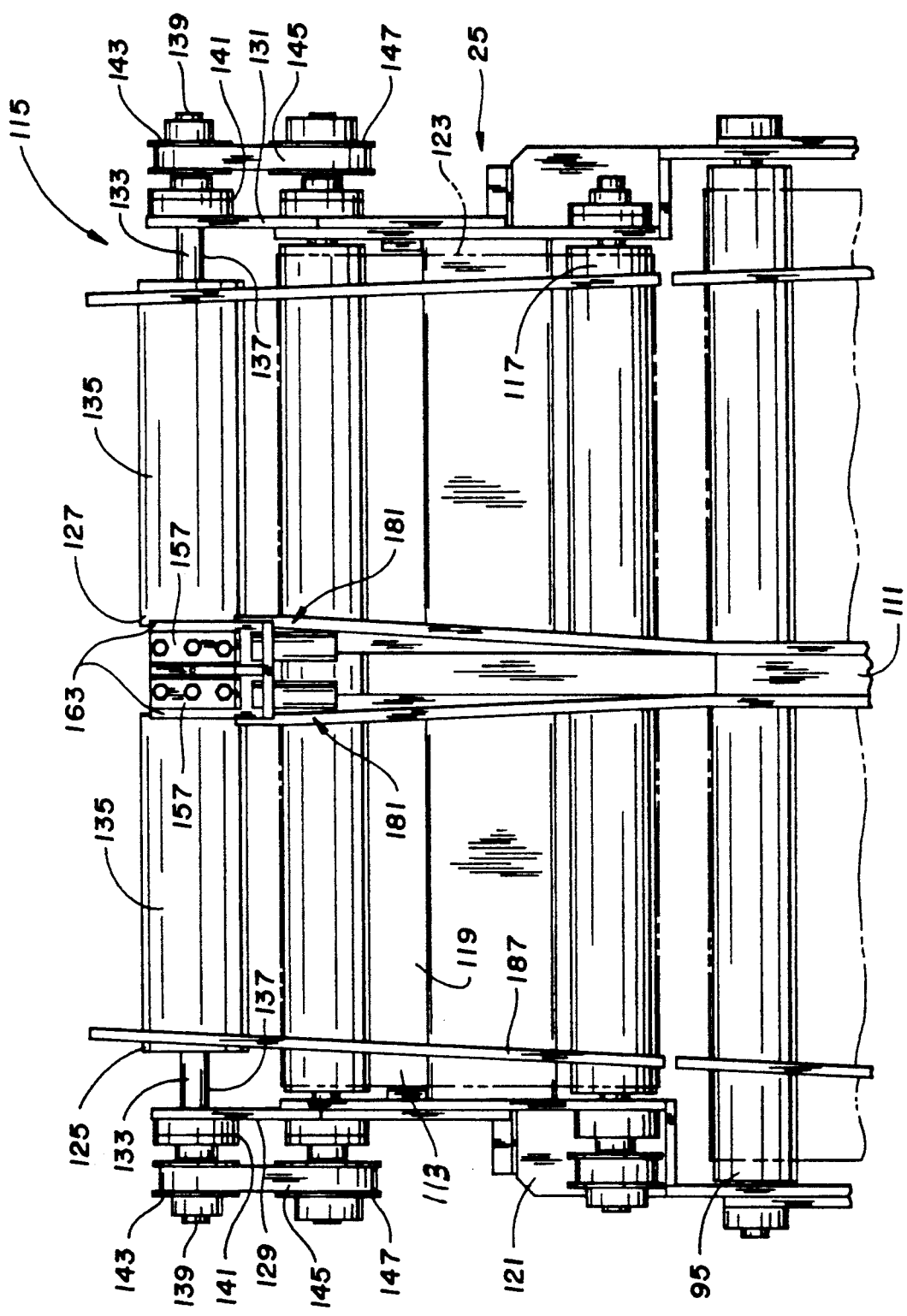
FIG. 8 is an enlarged partial plan view of a counting mechanism of the present invention for counting poultry.

The primary conveyor 75 discharges captured poultry onto an accelerator conveyor 113 positioned before a counting mechanism (broadly "counting means") indicated generally at 115 which counts the poultry so that the CPU can control the depositing mechanism 27 to deposit a predetermined number of poultry in each compartment 33 of the cages. The accelerator conveyor 113 conveys the poultry at a faster rate (e.g., 175 feet per minute) than the primary and side conveyor 75 (e.g., 90 feet per minute), so that the linear velocity of the belt of accelerator conveyor 113 is greater (approximately twice the velocity) than the linear velocity of belt 101. As a result, poultry moving from primary conveyor 75 onto the accelerator conveyor 113 are immediately accelerated thereby causing a separation between successive poultry before a counting mechanism 115 counts the poultry. Generally, the accelerator conveyor 113 is a relatively short conveyor comprising two rollers 117, 119, as shown in FIG. 8, one of which is driven by a hydraulic drive 121 for moving a belt 123 about the rollers. The partition 111 and accelerator conveyor 113 separate bunched up poultry so that poultry tends to travel through the counting mechanism 115 one at a time. This minimizes the possibility of miscounting two or more poultry as only one.

Figure 9:
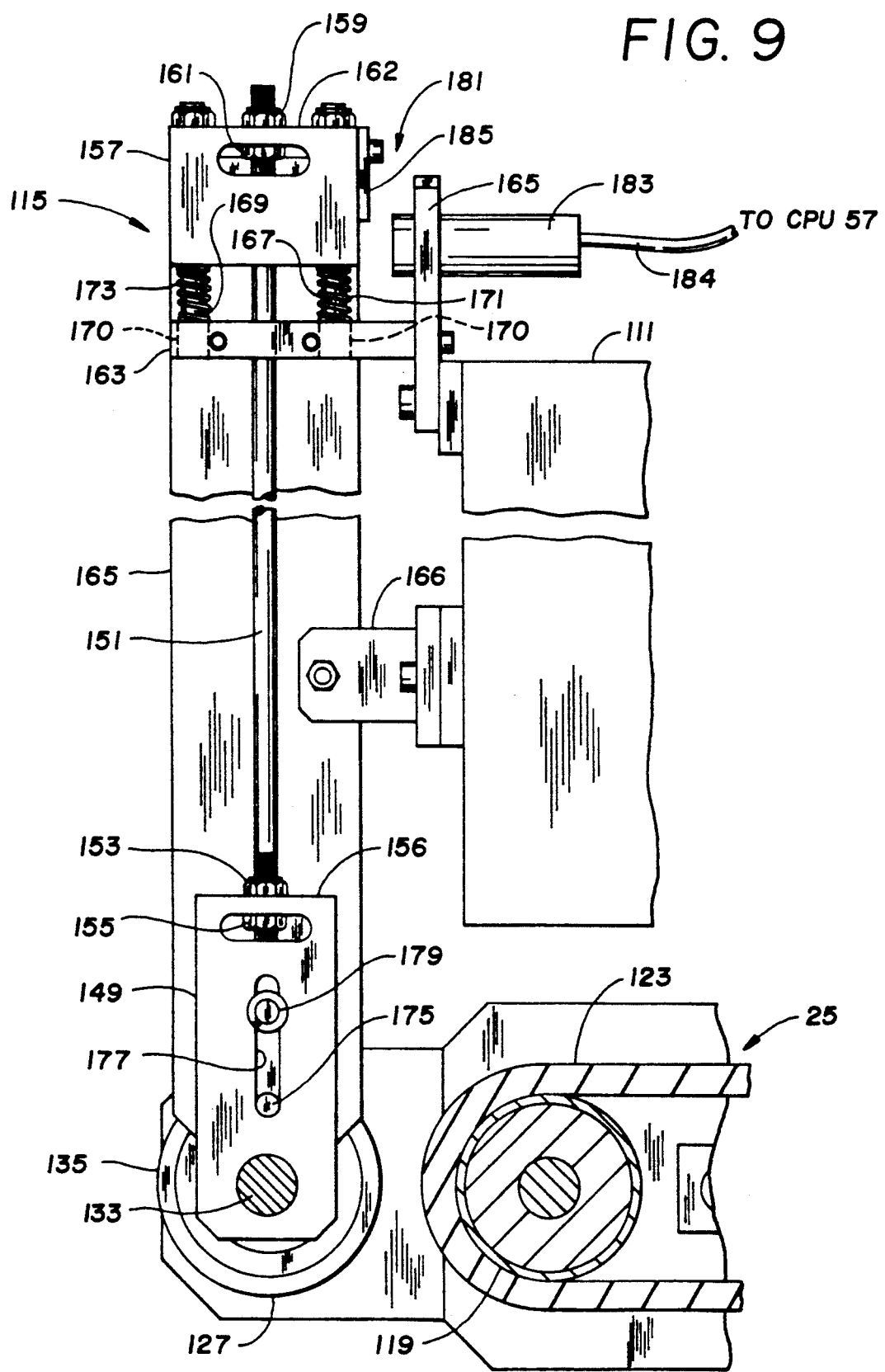
FIG. 9 is a partial side elevational view of the counting mechanism shown in FIG. 8.

Turning now to FIGS. 8 and 9, the counting mechanism 115 of the present invention includes two rollers 125, 127 positioned immediately after the accelerator conveyor 113. The rollers 125, 127 are parallel to the rollers of the accelerator conveyor 113 and have a rotational axis transverse to the direction of movement of the conveyors. Each roller 125, 127 is cantilevered such that their outer ends are supported by opposite side walls 129, 131 which extend upwardly from the primary conveyor frame. Since both rollers 125 and 127 are of the same construction, a description of one will suffice for the other. Each roller 125, 127 comprises a shaft 133 journalled within an annular support member 141 mounted on the side walls 129, 131. The shaft 133 coaxially supports a roller member 135 mounted on an inner portion 137 of the shaft extending inwardly from each side wall 129, 131. The roller member 135 has a greater outer diameter than and rotates with the shaft 133. A second portion 139 of the shaft 133 extends outwardly from side walls 129, 131. A gear 143 on and keyed to the shaft portion 139 is spaced from a support member 141. A timing belt 145 engages the gear 143 of each counting roller 125, 127 and connects to a gear 147 keyed on the end of roller 119 of the accelerator conveyor 113 so that each counting roller 125, 127 rotates in synchronism with and at a slightly higher rate of speed as the accelerator conveyor 113 (e.g., 200 feet per minute). The annular support member is a flanged self aligning bearing which engages the side wall 129, 131 so that the free end of each roller (i.e., portion 137) deflects downwardly when a poultry passes over the roller while providing enough stability so that the roller does not vibrate excessively during rotation.

Mounted at the free end of the first portion 137 of the shaft 133 of each roller 129, 131 is a bracket 149. A tie rod 151 has one threaded end attached to the bracket 149 by two nuts 153, 155 which capture a flange 156 of the bracket 149. The other threaded end of the rod 151 is attached to a mounting block 157 by two nuts 159, 161 which capture a flange 162 of the mounting block 157. A platform 163, which supports the mounting block 157, extends perpendicularly from a T-shaped support member 165 as viewed from above attached to the partition 111. A brace 166 also connects the support member 165 to the partition 111 approximately midway the length of the support to provide lateral stability to the support. Guide pins 167, 169 extend downwardly from the bottom side of the mounting block 157 and slide within guide openings 170 provided in the platform 163. Surrounding the portions of the pins 167, 169 which extend above the platform 163 are two coil springs 171, 173 which support the bottom of the mounting block. As shown, the springs are located between the mounting block 157 and the platform 163. The end of each counting roller 127 is supported or hung by the mounting block 157 and the tie rod 151 so that each counting roller is capable of deflecting downwardly, but is biased upwardly by the springs 171, 173 so that each counting roller maintains a relatively horizontal position. A first positioning pin 175 is provided at the bottom of a vertical slot 177 formed in the bracket 149 for limiting the upward movement of each counting roller, and likewise, an adjustable second positioning pin 179 is provided for limiting the downward movement of each counting roller. The first pin 175 is fixedly attached to the support 165 so that it limits the upward movement of both rollers 125, 127, while the second pin 179 is adjustable through a slot in the support.

Two sensors indicated generally at 181 sense the downward movement of each counting roller 125, 127. When the rollers move downward, in response to a poultry passing over them, the sensors 181 generate a triggering signal provided to the CPU 57 indicating that a poultry has passed over and downwardly deflected the counting roller. Each sensor 181 comprises a proximity sensor 183 mounted on the support member 165 for sensing the position of a plate 185 attached on the side of the mounting block 157 facing the sensor 183. Upon a single poultry passing over a counting roller and deflecting it downwardly, the plate 185 moves downwardly with block 157 such that it is in face-to-face relation to the proximity sensor 183 which in turn senses the plate 185 and subsequently generates a triggering signal via wire 184 provided to the CPU 57, thereby counting the poultry. After a poultry moves over and deflects the counting roller, the roller returns to its horizontal position by the urging of the springs 171, 173. It has been found that a single poultry passing over the roller may generate multiple triggering signals due the vertical vibration caused by the poultry passing over the roller. To prevent multiple counting of a single poultry, the CPU 57 is programmed with a time delay which inhibits the counting of a triggering signal generated within a preset period of about 20 milliseconds after a counted triggering signal.

The counting mechanism 115 may also comprise a weighing device (e.g., a linear transducer positioned between block 157 and platform 163) which generates a signal to the CPU corresponding to the weight of a poultry passing over and deflecting the counting roller. A typical poultry weighs approximately four pounds, so that if the CPU receives a signal indicating that eight pound passed over the counting roller, the CPU is programmed to recognize that two poultry, and not one, passed over the roller at generally the same time.

Referring to FIG. 2A, a plurality of removable hoods 187 enclose the conveying mechanism so that poultry on the conveyors does not escape during the harvesting. The hoods 187 are generally U-shaped in cross-section and are mounted onto the forward frame member 67 and the primary conveyor support frame 109 by any suitable means, such as nut and bolt fasteners (not shown). As shown in FIG. 8, the hood 187 over the accelerator conveyor 113 and counting mechanism 115 is slightly tapered so that poultry is channelled to form a single file as they travel over the counting rollers 125, 127. The hoods are removed in several of the views for illustration purposes.

After the poultry passes over the counting mechanism, it is then conveyed by a tiltable conveyor 189 to the depositing mechanism 27. The tiltable conveyor 189 includes a belt 191 movable over two spaced apart rollers 193, 195. Roller 193 is adjacent to and parallel with the counting rollers 125, 127, three free wheeling rollers 197, 199, and 201, and a drive roller 203 which is driven by a hydraulic motor 205. The tiltable conveyor is pivotally mounted about roller 193 on the chassis 37 and is pivotally mounted at its rearward end about roller 195 movable within slots 207 provided in the frame of the depositing mechanism to accommodate the upward and downward movement of the depositing mechanism 27. As shown in FIG. 2B, the roller 195 is at the forward end of the slot 207 when the depositing mechanism 27 is in its uppermost indexed position and at the rearward end of the slot 207 when the depositing mechanism 27 is midway through its indexing cycle. The tiltable conveyors 189 moves at a rate of speed slightly higher than the counting rollers 125, 127.

Figure 5:
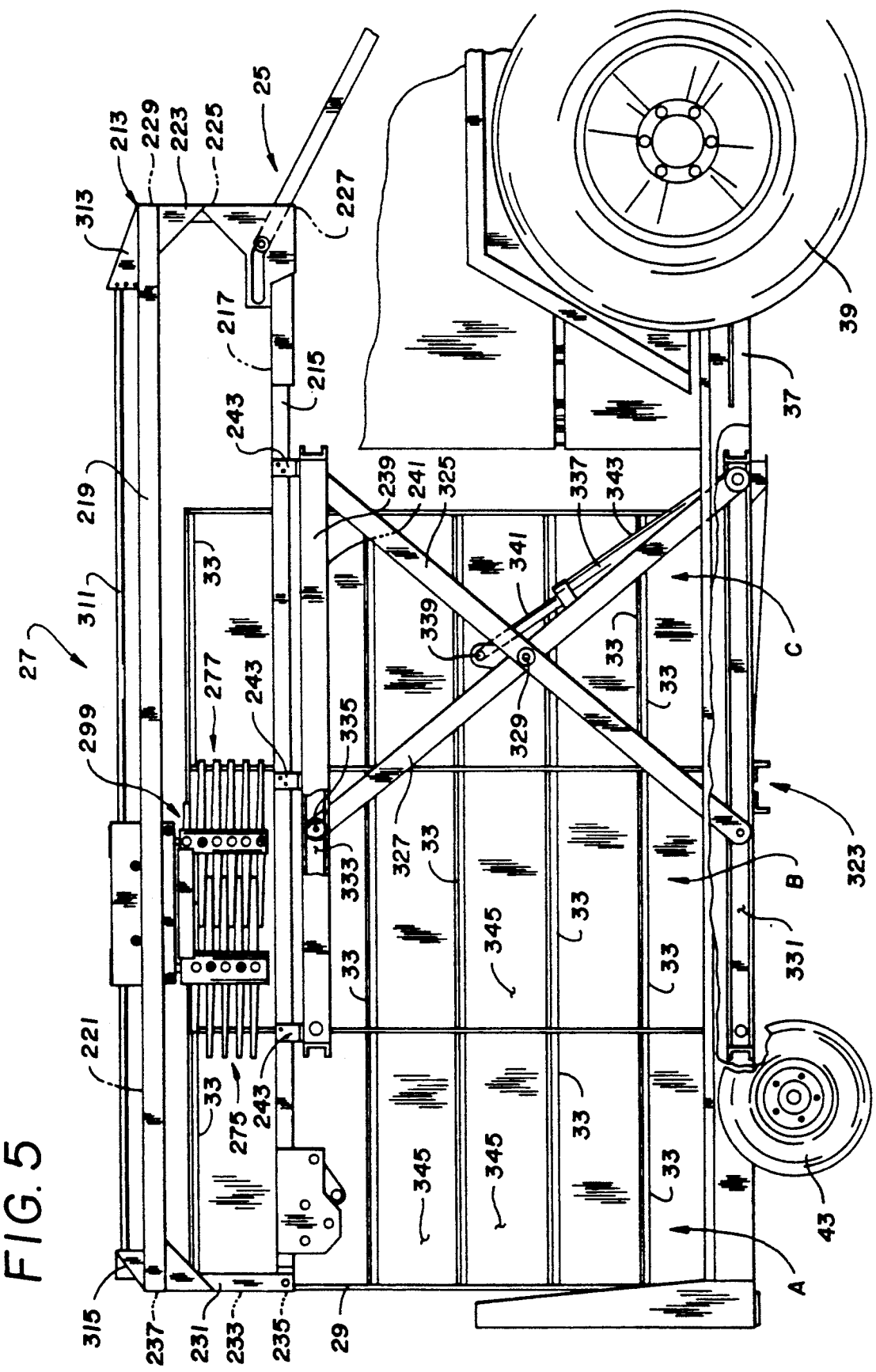
FIG. 5 is an enlarged partial side elevational view of a lift mechanism for lifting the depositing mechanism.

Turning now to FIGS. 1, 2B and 5, the depositing mechanism 27 is centrally located between the two cages 29, 31 so that it may deposit poultry into compartments 33 of either cage. To accomplish this function, the depositing mechanism 27 moves horizontally and vertically so that the poultry is discharged from discharge points 209, 211 located on either side of the depositing mechanism 27. The depositing mechanism 27 comprises a generally box-like frame indicated generally at 213 having four longitudinal rails 215, 217, 219, 221 which are connected at their opposing ends by four connecting rails 223, 225, 227, 229 and 231, 233, 235, 237. The bottom rails 215, 217 are mounted on two laterally spaced apart channel members 239, 241 via mounting brackets 243 with each channel having a generally C-shaped cross-section. The channel members 239, 241 are connected to each other by cross supports (not shown).

A delivery conveyor 245 delivers poultry from the tiltable conveyor 189 to a delivery mechanism 247 which delivers the poultry from the delivery conveyor 245 into a compartment 33. The delivery conveyor includes a belt 249 movable over two spaced apart rollers 251, 253 at a rate of speed slightly higher than the rate of speed of the tiltable conveyor 189. It should be noted that each conveyor moves at a faster rate than the conveyor positioned before it for preventing the jamming of poultry along the conveyor mechanism. Roller 251 is below and parallel to roller 195 of the tiltable conveyor 189, and four drive rollers 255, 257, 259, 261 driven by a hydraulic motor 263. The rollers 251, 253 are journalled at their opposite ends within the two bottom rails 215, 217 of the frame.

Figure 4:
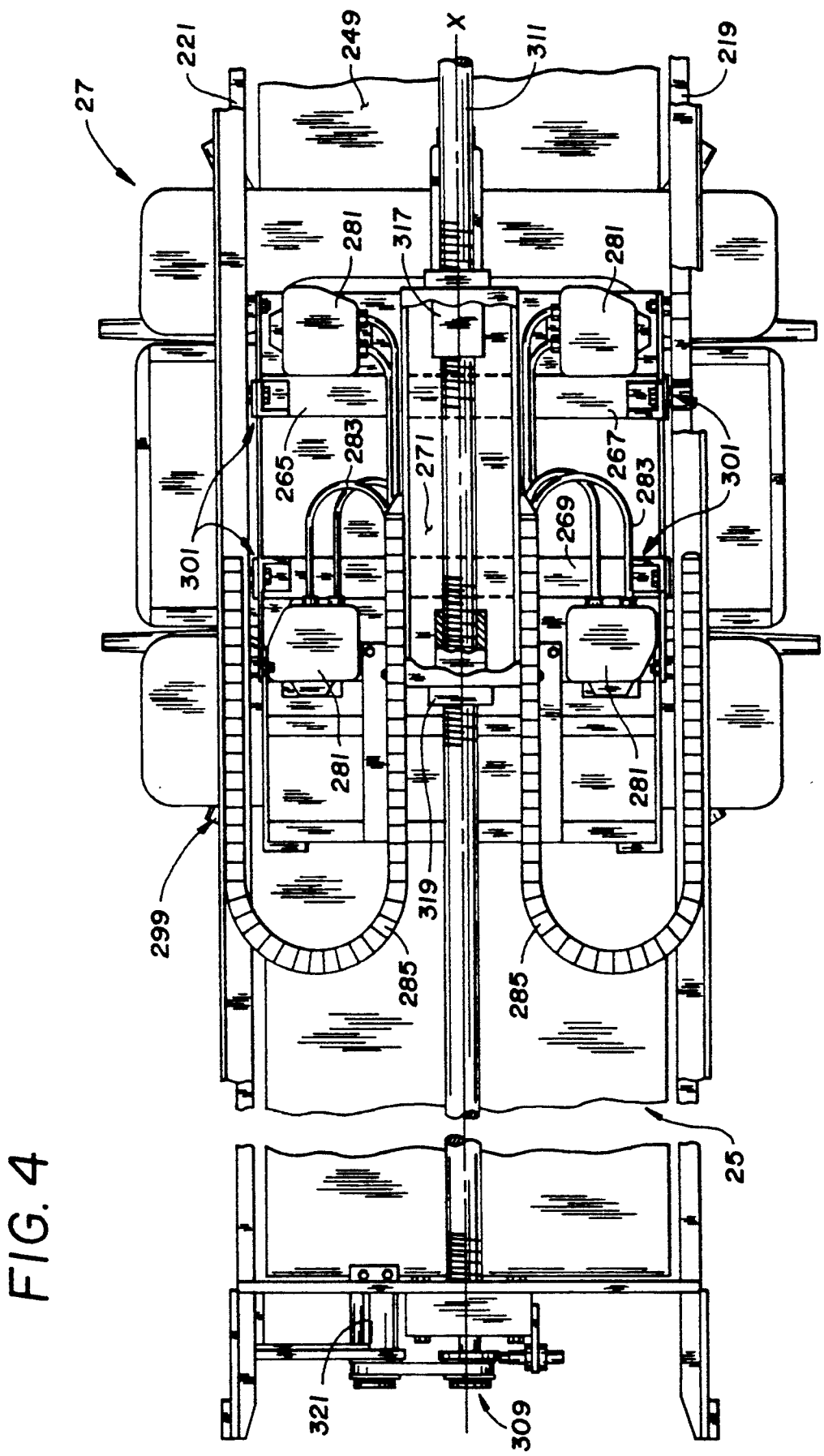
FIG. 4 is a partial top plan view taken of a depositing mechanism of the present invention.

Referring to FIGS. 2B, 3 and 4 the delivery mechanism 247 is mounted on the upper rails 219, 221 and includes an H-shaped frame 265 having two spaced apart Z-shaped frame members 267, 269 (shown in cross-section as viewed in FIG. 3) oriented transverse to the direction of movement of the poultry (i.e., the X axis) and a third frame member 271 fixedly attached on the two Z-shaped frame members 267, 269 over the center of the delivery conveyor 245. The H-shaped frame 265 supports four rotors, each indicated generally at 273, in which a rear (first) pair 275 of rotors are arranged side-by-side towards the rear of the harvester and a front (second) pair 277 of rotors are positioned adjacent to the rear pair of rotors and arranged side-by-side towards the front of the harvester. Each rotor 273 is rotatable about a vertical axis and has a continuous array of radially extending flexible (e.g., rubber) guide elements 279 cooperating with the guide elements of the other rotors. Driving the rotation of the rotors are hydraulic motors 281 which are connected to the hydraulic system by lines 283. As shown in FIG. 4, each line is protected by a flexible support 285 which flexes as the delivery mechanism 247 moves along and over the delivery conveyor 245.

The rear pair 275 of rotors 273C, 273D rotate in synchronism in the same direction, either clockwise or counterclockwise, for delivering poultry into one of the cages 29 or 31. In particular, the rear pair 275 rotate in a clockwise direction for delivering poultry into cage 31 and rotate in a counterclockwise direction for delivering poultry into the cage 29. As shown in FIG. 3, the rear Pair 275 of rotors each have a total twenty guide elements 279, five tiers of guide elements with four guide elements per tier, interlaced with a total of twenty-four guide elements 279 of the front pair 277, including six tiers of guide elements with four guide elements per tier. The front pair 277 has one rotor 273A rotating clockwise in an opposite direction to the other rotor 273B rotating counterclockwise, such that poultry on the delivery conveyor 245 is drawn in between the rotors 273A and 273B. The arrangement is such that poultry moves along the delivery conveyor 245 until it reaches the front pair 277 of rotors 273A, 273B at which point it is drawn between the front pair 277 and discharged to the rear pair 275 of rotors 273C, 273D the rear pair 275 rotates to deliver the poultry to either cage in a direction transverse to the direction of movement of the delivery conveyor with assistance from the rotors 273A and 273B of the front pair 277.

A plurality of horizontal plates 291, 293 are mounted onto the frame 213 for realigning the guide elements 279 and preventing the interentanglement of the guide elements 279. Brackets 295, 297 which are attached to the frame by suitable fasteners (e.g., nut and bolt fasteners) support the plates 291, 293 in a position to engage the guide element 279 as the rotor rotates. As shown in FIG. 3, plates are provided between each tier of guide elements.

Figure 6:
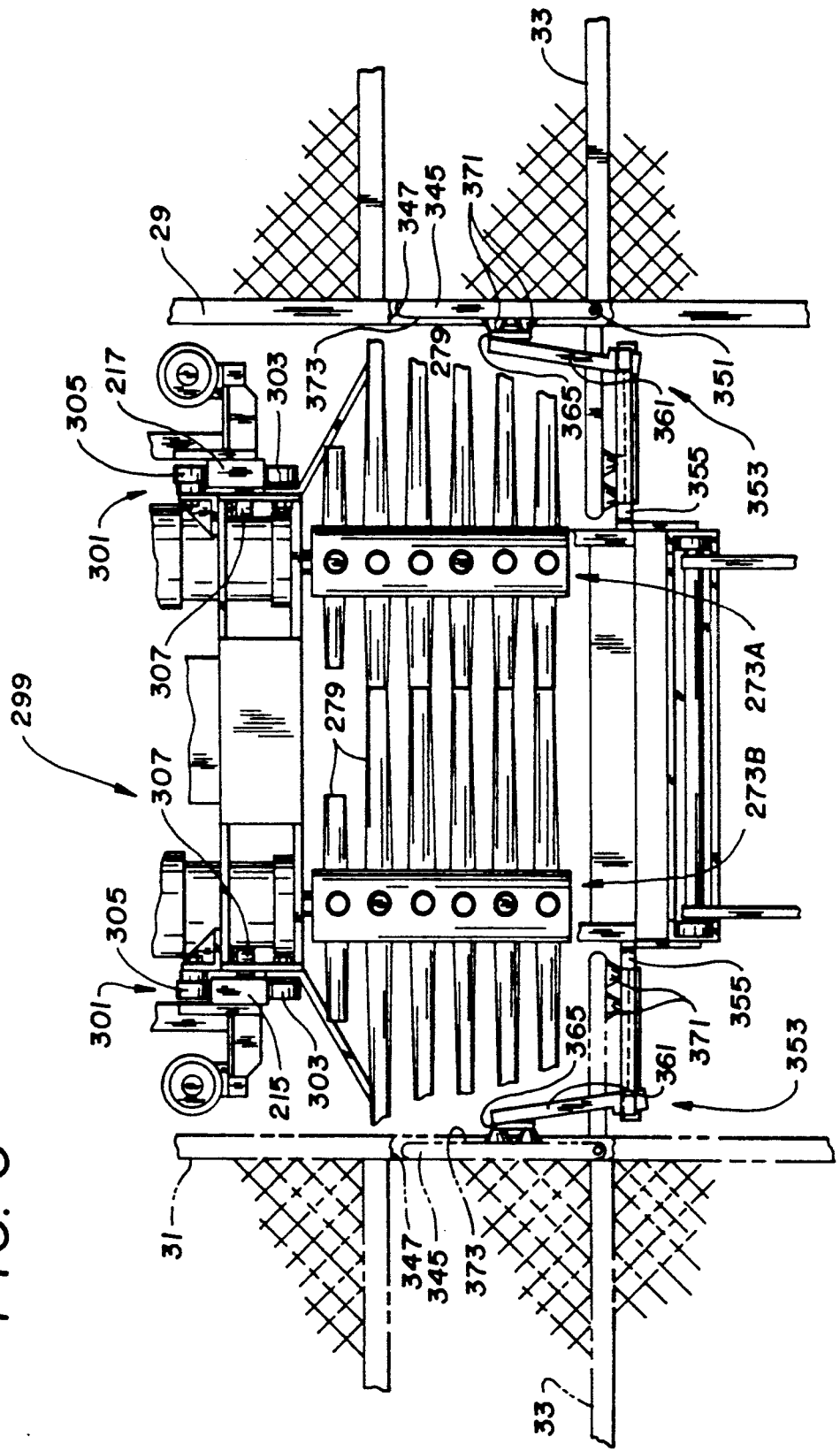
FIG. 6 is an enlarged end elevational view taken along line 6—6 in FIG. 1 showing a door opening mechanism of the present invention for opening a door to the compartment of the cage.

As shown in FIGS. 4, 5 and 6, the delivery mechanism 247 moves back and forth horizontally in a direction corresponding to the direction of the delivery conveyor (i.e., axis X). An aligning mechanism 299 guides the relative movement between the delivery mechanism 247 and the cages so that the delivery mechanism 247 delivers the poultry into each of the three columns A, B, C of compartments 33 of the cage. The aligning mechanism 299 includes four groups of rollers, each group indicated at 301, positioned at the corners of the H-shaped frame 265, the rollers being adapted to travel along the upper rails 219, 221 of the frame 213. More specifically, each group of rollers 301 comprises two offset rollers 303, 305 which travel along the bottom and top edges of the rail, and a side roller 307 which travel along the inside side edge of the rail.

A moving mechanism embodying a ball screw drive 309 drives the delivery mechanism 247. Drive 309 comprises a threaded shaft 311 centrally located above the delivery conveyor 245 along axis X and journalled at its opposite ends within housings 313, 315 mounted on the frame 213. Drive 309 also comprises two internally threaded receiving members 317, 319 mounted on the third frame member 271 of the delivery mechanism 247 which engage the shaft 311. When the shaft 311 rotates, the delivery mechanism 247 moves horizontally back and forth along axis X. A hydraulic motor 321 rotates the shaft 311 and is connected to the hydraulic system via hydraulic lines (not shown). The CPU 57 controls the operation of the ball screw drive 309 to move it in response to filling a compartment with a predetermined number of poultry as counted by the counting mechanism 115.

A lift generally indicated at 323 conjointly moves and lifts each of the channel members 239, 241, which support the delivery conveyor 245, delivery mechanism 247, aligning mechanism 299 and the moving mechanism 309. The lift 323 is formed of two coplanar pairs each having first and second scissor members 325, 327 positioned between the chassis 37 (or "frame member") and the channel members 239, 241 for lifting the aforementioned mechanisms upwardly and downwardly in a vertical direction. Each scissor member 325, 327 is pivotally attached to the other member of its pair generally centrally between the ends thereof by a large pin 329. Each scissor member 325, 327 is of the same construction and may be made from square or rectangular tube material (e.g., steel), as well as pin 329. Cross bracing between parallel members (not shown) may also be provided for additional lateral support. The first scissor member 325 has one end pivotally attached to the channel member 239 (e.g., by a pin) and its other end moves along a channel 331 formed in the chassis 37. Likewise, the second scissor member 327 has one end pivotally attached to the chassis 37 and its other end moves in channel 333 formed in the channel member 239. The movable ends of each scissor member 325, 327 comprise a roller 335 which is captured by the channels 331, 333.

A hydraulic piston 337 pivotally attached to the chassis 37 at one end thereof and pivotally attached at its other end to a bracket 339 mounted on the large pin 329 moves the pairs of scissor members. A hydraulic line (not shown) which is connected to the hydraulic system provides pressurized fluid to the piston 337. A sensor (not shown) mounted in the piston (called a "Temposonic" device) senses the length of extension of the inner piston shaft member 341 from the piston cylinder 343. When the lift moves the aforementioned mechanisms upwardly and downwardly, the sensor detects the movement and provides position feedback information to the information to the CPU 57 (or to the Temposonic device). Thus, the vertical position of the depositing mechanism 27 may be easily monitored.

Figure 7:
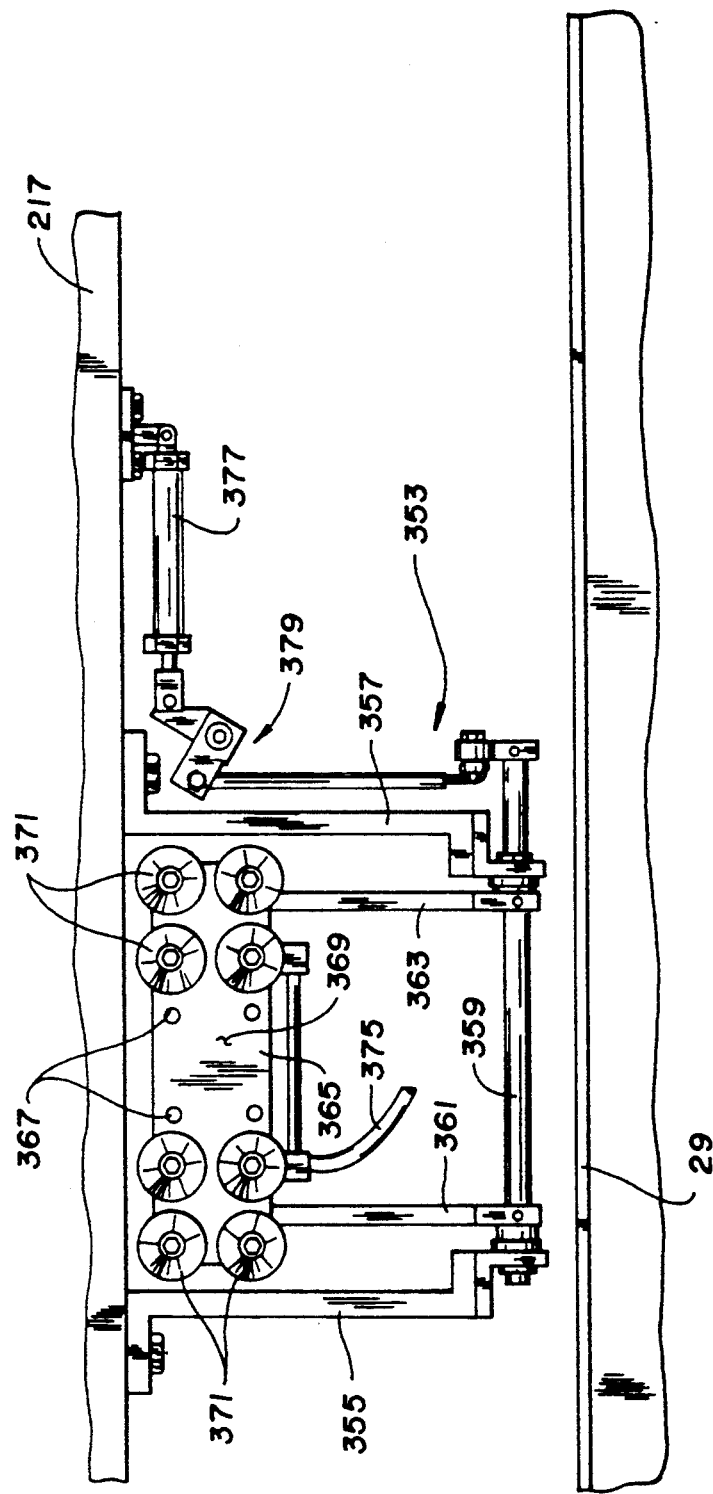
FIG. 7 is a partial top plan view of the door opening mechanism of FIG. 6.

As shown in FIGS. 6 and 7, each compartment 33 includes a door 345 for selectively blocking an opening 347 accessing the compartment 33. As shown, each door 345 is hinged along its bottom edge margin 349 by conventional means (e.g., a hinge 351) such that the door moves between a position in which it blocks the compartment opening to a position in which the door pivots about its hinge away from the opening so that poultry may enter the opening and thereby enter the compartment. Hinge 351 is spring loaded to bias the door in its closed position. A door opening mechanism indicated generally at 353 opens the door prior to delivery of the predetermined number of poultry into the compartment 33 by the delivery mechanism 247. There are three door opening mechanisms 353 mounted on each of the bottom rails 215, 217 of the frame 213 corresponding to the locations of the three columns A, B, C of compartments provided in each tier of the cage. The doors to a particular compartment are opened and closed by CPU 57 when the delivery mechanism 247 is not in front of the particular compartment because the delivery mechanism interferes with the door if opened when the delivery mechanism is in front of the door.

Referring now to FIGS. 6 and 7, since each opening mechanism 353 is of the same construction, a description of one will suffice for all. Each opening mechanism 353 comprises two Z-shaped support brackets 355, 357 mounted on the bottom rail 217 and extending away from the rail towards the cage 29. Journalled within each Z-shaped bracket 355, 357 and extending therebetween is a shaft 359 having two arms 361, 363 mounted on each end of the shaft 359 in close proximity to the Z-shaped brackets. In its horizontal position ("a first position") each arm 361, 363 extends from the shaft 359 towards the bottom rail 217 and has attached at its other end a plate or manifold 365 having passaging therein leading to ports 367 provided on the surface 369 of the plate. Most of the ports 367 have suction cups 371 fitted therein which are adapted to engage the face 373 of a door as the arms 361, 363 pivot about the shaft 359. The passaging in the plate 365 is connected to a vacuum via line 375. A hydraulic piston 377 connected to shaft 359 by a linkage 379 rotates the shaft about its longitudinal axis. As a result, arms 361 pivot from a generally horizontal to a generally vertical Position such that the suction cups 371 selectively engage the door 345. As the arms 361, 363 pivot toward a closed door 345, suction cups 371 draw atmospheric air into the plate 365 and positively attach to the door 345 as the suction cups 371 engage the door 345 in its closed position ("a second position"). The arms 361, 363 are then pivoted to a first position at which the door 345 is open. After delivery of poultry into the compartment 33, the delivery mechanism 247 moves to an adjacent position. CPU 57 activates cylinder 377 thereby causing shaft 359 to rotate arms 361, 363 to a vertical position in which the vacuum is turned off, thus closing door 345. The CPU 57 then activates the cylinder 377 to rotate the arms 361, 363 back to their horizontal position. The CPU 57 controls the operation of the opening mechanism 353 to pivot the arms 361, 363 between their first and second position.

It is envisioned that other methods for retaining the doors 345 may be utilized. One such method would be to replace the vacuum and suction cup assembly with a number of electro-magnetic door engaging members. The engaging members would engage metal plates on the doors and the electro-magnetic component of the members would be selectively activated by CPU 57 for retaining the door to the member.

In operation, one of three pairs of rotors 61, 63, 65 capture a poultry at the forward end of the harvester 21. Guide elements 69 extending from the rotors 61, 63, 65 gently capture the poultry and discharge it to the conveying mechanism 25. Poultry captured by rotors 61 and 65 is discharged onto two side conveyors 71, 73 which lead to a primary conveyor 75. Poultry captured by rotors 63 is discharged directly onto the primary conveyor 75. The poultry then travel along the ramped primary conveyor 75 in a direction towards the rear of the harvester 21 and are discharged onto the accelerator conveyor 113 which accelerates it. The accelerator conveyor 113 the partition 111 and the tapering of the hood 187 assist in separating the poultry so that a more accurate count may be obtained. The accelerator conveyor 113 discharges the poultry onto the counting mechanism 115 which generates a signal Provided to the CPU 57 noting the passage of the poultry over one of the counting rollers 125 or 127. The CPU 57 counts the poultry at this point and maintains a running count of poultry so that only a predetermined number of poultry is deposited in a compartment 33. The poultry next moves from the counting mechanism 115 towards the depositing mechanism 27 via a tiltable conveyor 189.

The depositing mechanism 27 includes a delivery conveyor 245 which generally runs the length of each cage 29, 31. The delivery mechanism 247 delivers the poultry from the delivery conveyor 245 into a compartment 33 of one cage. The delivery mechanism 247 includes four rotors 273 which are capable of delivering poultry into either cage 29 or 31. Upon delivering a predetermined number of poultry into a compartment, aligning mechanism 299 and moving mechanism 309 move the delivery mechanism 247 co-linearly with the direction with respect to the delivery conveyor 245 (along axis X) so that the delivery mechanism 247 delivers poultry into the next horizontally adjacent compartment. The harvester operator determines the direction of movement of the delivery mechanism (i.e., whether it travels from front to back, or vice versa) and inputs this information into the CPU 57. Upon filling a row of compartments with poultry, the depositing mechanism 27 moves upwardly or downwardly in a vertical direction for filling compartments on upper or lower tiers. A lift 323 accomplishes this movement, and like the aligning and moving mechanisms, it may be programmed to move either upwardly or downwardly upon filling a row of compartments.

Before delivering the poultry into a compartment, a door opening mechanism 353 opens a door 354 blocking an opening 347 accessing the compartment. The sequence of operation is such that upon delivering a predetermined number of poultry into a first compartment, but before the aligning and moving mechanisms move the delivery mechanism to the next adjacent second compartment, the door opening mechanism for the next adjacent second compartment opens its door. The delivery mechanism 247 moves so that poultry is delivered into the second compartment and the door opening mechanism for the first compartment closes the door so that it closes to prevent poultry from escaping. The opening mechanism 353 opens and closes the doors when the delivery mechanism 247 is not in front of the compartment because the delivery mechanism 247 interferes with opening or closing the door if the delivery mechanism 247 is in position for delivering poultry in front of the compartment.

After filling each compartment of a cage (e.g., cage 29) with the predetermined number of poultry, the delivery mechanism 247 delivers poultry into the other cage (e.g., cage 31) under the direction of the CPU 57. Since the first pair 275 of rotors 273C, 273D are capable of rotating in either direction, the poultry may be delivered to either cage at discharge points 209 and 211. While delivering poultry to the other cage, the filled cage may be replaced by an empty cage. A forklift may pick up and move the cages, which are standard in the poultry industry. Typically, a forklift operator has approximately two to three minutes to remove the filled cage and replace it with an empty one. This procedure continues (i.e., poultry is delivered alternately in cages which are replaced by empty cages by the forklift operator) until all of the poultry in the poultry house are caged.

Figure 10:
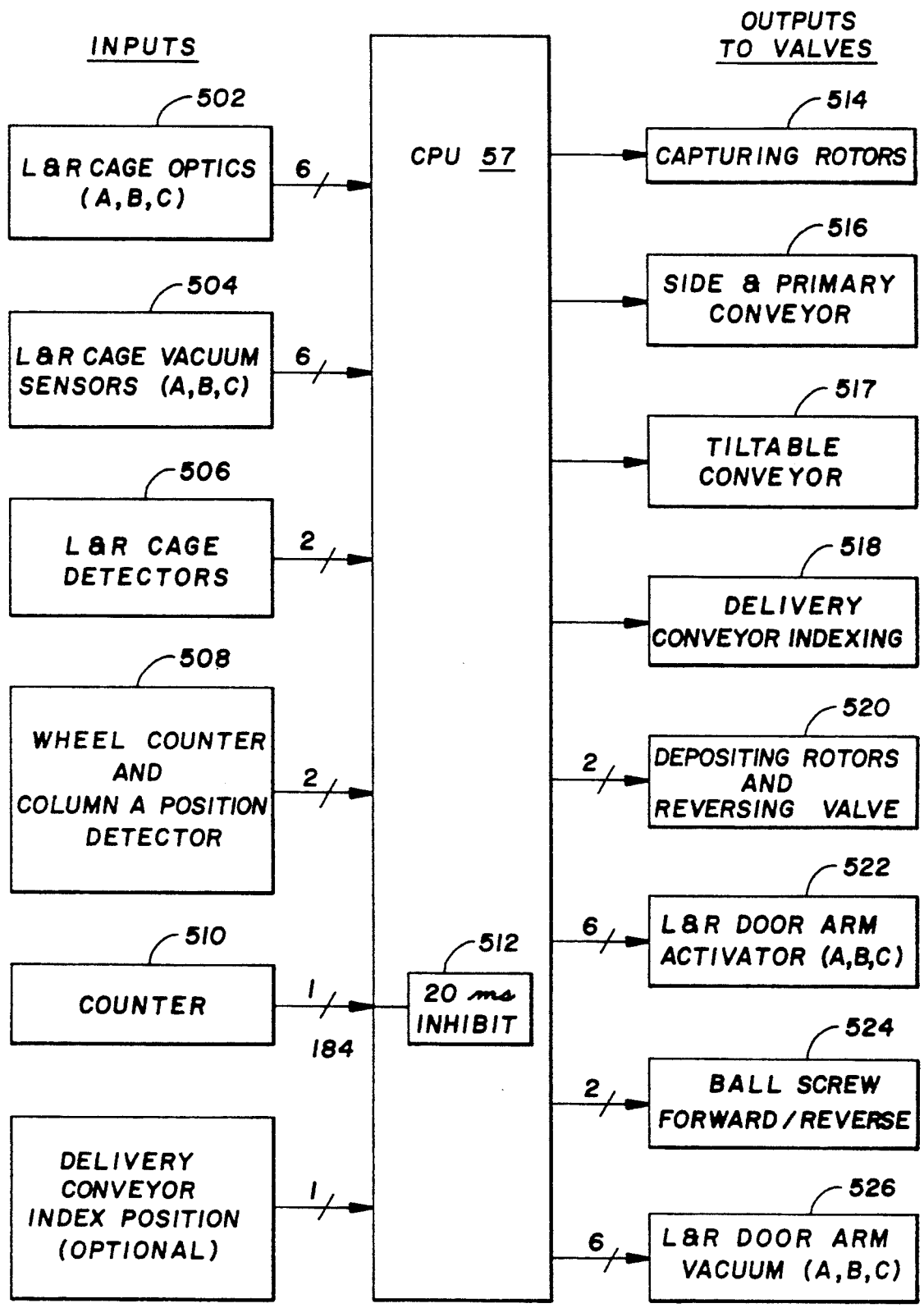
FIG. 10 is a block diagram of the electronics of the poultry harvester showing the CPU inputs and outputs.

CPU 57 as illustrated in FIG. 10 receives various inputs indicating the status of the harvester 21 at any point in time. Based on this input information, CPU 57 provides outputs to valves for controlling the operation of harvester 21. In particular, CPU 57 receives six input signals from left and right cage optics 502 for columns A, B, and C. These optics 502 include infrared sensors to detect the positions of the doors 345 of each cage 29, 31 and primarily to confirm that the necessary doors are closed so that the depositing mechanism 27 may be moved.

CPU 57 also receives six input signals from left and right cage vacuum sensors 504 for columns A, B, and C. These sensors 504 verify that a vacuum exists within the engaging arm manifold 365 thereby indicating that the engaging arms 361, 363 have properly attached themselves to the door which is to be opened. CPU 57 also receives two input signals from the left and right cage detectors 506 which are proximity switches verifying that the left and right cages 29, 31 are in fact in place.

Additionally, CPU 57 receives two input signals, one from an encoding wheel counter and another from a column A position detector as indicated generally by box 508. The wheel counter essentially counts the turns of an encoding wheel on the ball screw to indicate the position of the depositing mechanism 27 and the column A position detector senses that the depositing mechanism 27 has returned to the column A position. CPU 27 also receives a counter signal from counter 510. This signal is provided via line 184 to the CPU 57. As indicated above, the CPU 57 is programmed to count only signals which are more than twenty milliseconds apart as indicated by the twenty millisecond inhibit box 512. Alternatively, the CPU 57 may be provided with a signal indicating the indexed position of the delivery conveyor 245.

CPU 57 controls the operation of poultry harvester 21, in part, by opening and closing the various hydraulic and vacuum valves connected to its outputs. In particular, capturing rotors valve 514 is opened to deliver pressurized hydraulic fluid to the hydraulic motors driving rotors 61, 63, and 65. Side and primary conveyor valve 516 is opened or closed by CPU 57 to start or stop the side conveyors 71 and 73 and the primary conveyor 75 by selectively providing hydraulic fluid to the hydraulic motor driving these conveyors. Additionally, tiltable conveyor valve 517 is selectively opened or closed to provide hydraulic fluid for driving the tiltable conveyor 189. Also, delivery conveyor valve 518 controls hydraulic fluid for driving the delivery conveyor 245.

Two output lines control the rotors of the delivery mechanism 247 and reverse its direction by controlling the position of a depositing rotors valve for driving these rotors and a reversing valve for controlling the direction of rotation of the rear rotors, these valves being indicated generally by reference character 520. Six outputs are provided by the CPU 57 to control six actuator valves 522 for moving the left and right door arms 361, 363. Two outputs are provided by CPU 57 to drive the ball screw and control its direction via ball screw valve and forward and reverse valve 524. Finally, six outputs are provided to control vacuum valves 526 which provide vacuum pressure to the left and right door arms.

Figure 11:
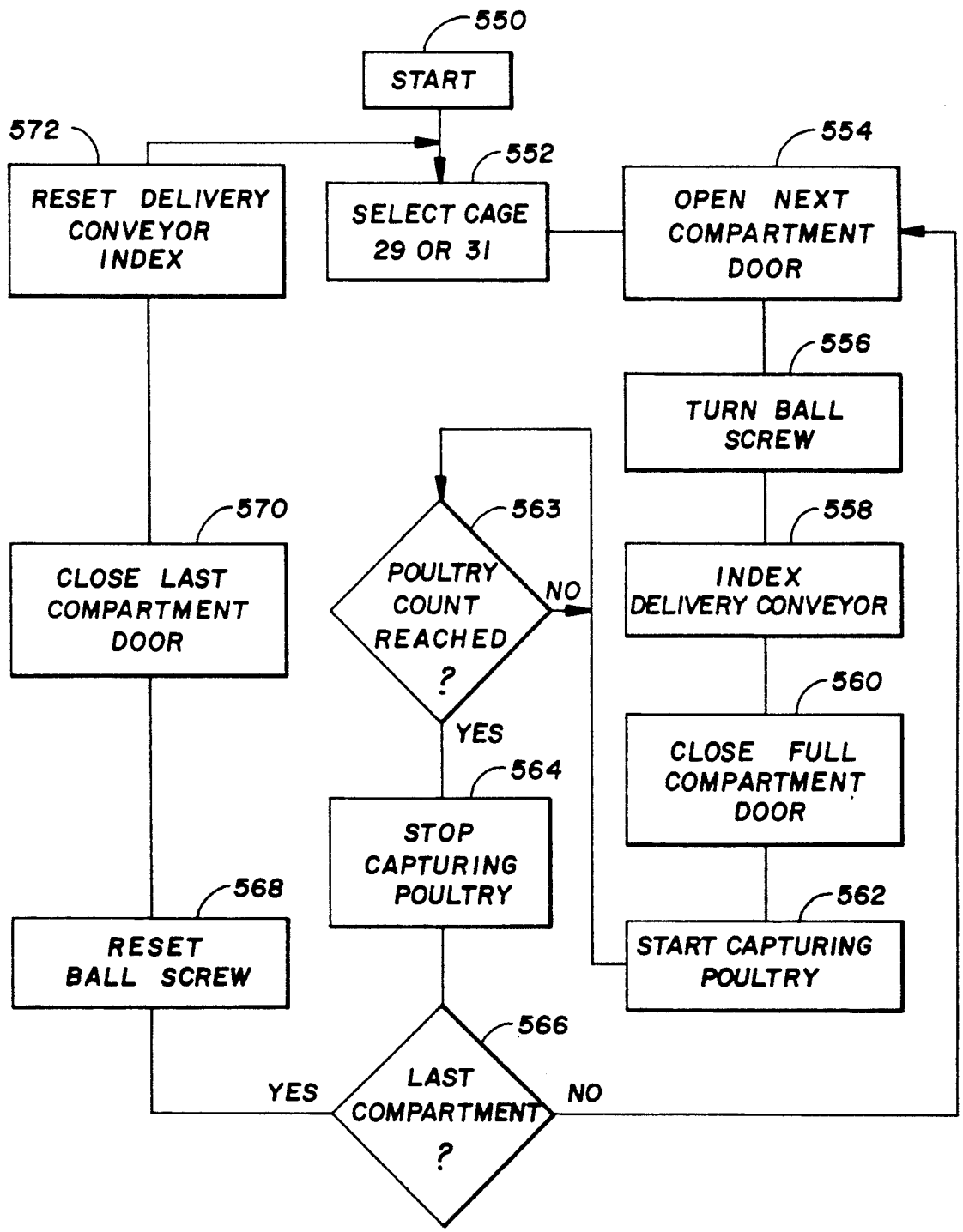
FIG. 11 is a flow diagram showing the sequence of operation of the poultry harvester of the invention.

FIG. 11 is a flow chart illustrating the general operation of CPU 57. After an initializing start step 550, the operator either manually selects or the CPU 57 automatically selects by step 552 cage 29 or cage 31 to be filled. CPU 57 then opens the selected vacuum valve 526 and the selected actuator valve 522 to open the next compartment door at step 554. Next, ball screw valve 524 is actuated by step 556 to move the delivery mechanism 247 into position and delivery conveyor indexing valve 518 is selectively actuated by step 558 to position the delivery conveyor 245 at the appropriate vertical level. At step 560, CPU 57 provides an output to the appropriate actuator valve 522 to close the full compartment door if a previous compartment had been filled. For the filling of the first compartment of cage 29 or cage 31, this step is bypassed.

At step 562, the capturing mechanism 23, side conveyor 71, 73, primary conveyor 75, and the accelerator conveyor 113 are actuated by inputs provided to the capturing rotor valves 514 and the primary and side. The delivery mechanism 247, tiltable conveyor 189 and delivery conveyor 245 normally operate continuously. Thereafter, the CPU counts signals provided via counter 510 until the predetermined count has been reached at step 563. At this point, the capturing 247 is stopped by step 564 which provides inputs to the capturing mechanism 23, side conveyors 71, 73, primary conveyor 75 and accelerator conveyor 113 to close the valve and discontinue delivery of pressurized hydraulic fluid to the motors driving the delivery mechanism and associated conveyors. CPU 57 keeps track of the compartments that are being filled and, at step 566, if the last compartment has been filled, the CPU proceeds to step 568 to reset the position of ball screw and the delivery mechanism 247 by controlling ball screw valve 524. If the last compartment has not been filled, the CPU 57 returns to step 554 to open the next compartment door by actuating its door arm actuator valve 522 and its vacuum valve 526. After resetting the ball screw position at step 568, the last compartment door is closed at step 570 and the delivery conveyor position is also indexed and reset at step 572. Thereafter, the CPU returns to step 552 to either manually or automatically select the next cage.

In view of the above, it will be seen that the several objects of the invention are achieved and other advantageous results attained.

As various changes could be made in the above constructions without departing from the scope of the invention, it is intended that all matter contained in the above description shall be interpreted as illustrative and not in a limiting sense.

What is claimed is:

1. A poultry harvester for capturing poultry on a generally horizontal plane, such as the floor of a poultry house, and transferring a predetermined number of captured poultry to a compartment of a cage having a plurality of compartments, the poultry harvester comprising:
   means for capturing the poultry;
   means for counting the captured poultry;
   means for conveying the captured poultry;
   means for depositing the conveyed poultry into each of the compartments of the cage;
   means for providing relative movement between the depositing means and the cage; and
   means, responsive to the counting means, for controlling said depositing means and said movement providing means to deposit the predetermined number of poultry as counted by said counting means in each of the compartments of the cage.

2. A poultry harvester as set forth in claim 1 wherein said capturing means comprises at least one pair of rotors arranged side-by-side with each rotor providing a continuous array of radially extending guide elements cooperating with the guide elements of the other rotor, said rotors rotating about axes such that the guide elements cooperate to capture and transfer said poultry between the rotors to said conveying means.

3. A poultry harvester as set forth in claim 2 wherein said capturing means comprises at least two pairs of said rotors, and wherein said conveying means comprises main conveyor means for providing captured poultry to the depositing means and two side conveyors, each being associated with one pair of rotors for transferring captured poultry from the associated pair of rotors to the main conveyor means.

4. A poultry harvester as set forth in claim 1 wherein said conveying means further comprises a first conveyor for receiving captured poultry and a second conveyor positioned between said first conveyor and said counting means, said second conveyor conveying captured poultry at a faster rate than the first conveyor thereby accelerating the rate at which captured poultry are conveyed, whereby the second conveyor substantially separates adjacent poultry before said counting means counts the poultry.

5. A poultry harvester as set forth in claim 1 wherein said conveying means includes a conveyor for moving captured poultry in a direction from the capturing means toward the depositing means and wherein said counting means comprises means, adjacent the conveyor, for detecting poultry as they are conveyed.

6. A poultry harvester as set forth in claim 5 wherein said counting means comprises a roller positioned at an end of the conveyor and having a rotational axis transverse to the direction of movement of the conveyor, the roller being adapted to deflect downwardly when a poultry passes over the roller, and means for sensing the downward movement of the roller such that when the roller moves downward, said sensing means generates a triggering signal provided to said controlling means indicating that a poultry has passed over and downwardly deflected the roller.

7. A poultry harvester as set forth in claim 6 wherein said controlling means comprises means for counting the triggering signals and means for inhibiting the counting of a triggering signal generated within a preset period after a counted triggering signal.

8. A poultry harvester as set forth in claim 7 wherein said conveying means further comprises a first conveyor for receiving captured poultry and a second conveyor positioned between said first conveyor and said roller, said second conveyor conveying captured poultry at a faster rate than the first conveyor thereby accelerating the rate at which captured poultry are conveyed whereby the second conveyor substantially separates adjacent poultry before said counting means counts the poultry.

9. A poultry harvester as set forth in claim 1 wherein said depositing means comprises at least two adjacent rotors arranged side-by-side with each rotor providing a continuous array of radially extending guide elements cooperating with the guide elements of the other rotor, said rotors rotating about generally vertical axes such that the guide elements cooperate deliver poultry from said conveying means into a compartment.

10. A poultry harvester as set forth in claim 1 wherein two cages are provided and the depositing means is located between the two cages, said depositing means comprising a first pair of rotors arranged side-by-side with each rotor providing a continuous array of radially extending guide elements cooperating with the guide elements of the other rotor, said first pair of rotors being selectively rotatable in the same direction about generally vertical axes for delivering the poultry into one of said cages, and a second pair of rotors arranged side-by-side with each rotor providing a continuous array of radially extending guide elements cooperating with the guide elements of the other rotor, said second pair of rotors being rotatable about generally vertical axes with one rotor rotating in a direction opposite of the other rotor, the second pair of rotors being positioned next to the first pair of rotors, each pair providing a continuous array of radially extending guide elements cooperating with the guide elements of the other pair such that poultry from said conveying means is fed through the second pair of rotors to the first pair of rotors and into the compartment, whereby poultry may alternatively be delivered into either cage by selectively rotating the first pair of rotors in the direction towards the cage where poultry are to be delivered.

11. A poultry harvester as set forth in claim 1 wherein said depositing means further comprises means for delivering poultry from said conveying means to a compartment and said movement providing means comprises means for aligning said delivery means with each of the compartments, said aligning means adapted to provide relative linear movement between the delivery means and the cage so that said delivery means delivers the predetermined number of poultry into each of the compartments of the cage, said aligning means being operated by said controlling means for providing relative movement between said delivery means and the cage in response to filling a compartment with the predetermined number of poultry.

12. A poultry harvester as set forth in claim 11 wherein said conveying means includes main conveying means for moving captured poultry along an axis of the harvester from said capturing means toward said depositing means and said depositing means deposits poultry in a direction transverse to said axis from the main conveying means to a cage positioned adjacent said depositing means.

13. A poultry harvester as set forth in claim 12 wherein each cage has at least two compartments in side-by-side relation, and wherein said aligning means comprises means for guiding said delivery means along said axis for delivering poultry into the compartments of the cage.

14. A poultry harvester as set forth in claim 13 wherein said main conveying means comprises a delivery conveyor for moving poultry along said axis, said delivery conveyor being in-line with said main conveying means such that poultry traveling along said main conveying means are discharged onto the delivery conveyor which delivers the discharged poultry to said delivery means for delivery into the compartment of the cage.

15. A poultry harvester as set forth in claim 14 further comprising means for moving said delivery means relative to the delivery conveyor along said axis.

16. A poultry harvester as set forth in claim 15 further comprising a lift adapted to conjointly move said delivery conveyor and said delivery means upwardly and downwardly in a vertical direction and a frame for supporting the lift.

17. A poultry harvester as set forth in claim 16 wherein the lift comprises first and second scissor members positioned between the frame and the delivery conveyor, said scissor members being pivotally attached to each other generally centrally between ends of each member, the first scissor member having one end pivotally attached to the delivery conveyor and its other end movable along a channel in the frame, and the second scissor member having one end pivotally attached to the frame and its other end movable along a channel in the delivery conveyor.

18. A poultry harvester as set forth in claim 1 wherein each compartment comprises a door for selectively blocking an opening accessing the compartment, said harvester further comprising means for opening the door during delivery of the predetermined number of poultry into the compartment by said delivery means.

19. A poultry harvester as set forth in claim 18 wherein said opening means comprises at least one pivotable arm for selectively engaging the door in response to the control means between a first position corresponding to an open door and a second position corresponding to a closed door, and means responsive to the controlling means for moving the arm between the first and second positions.

20. A poultry harvester as set forth in claim 1 wherein said conveying means includes a primary conveyor which receives and conveys poultry from said capturing means, a tiltable conveyor which receives and conveys poultry from the primary conveyor and a vertically movable delivery conveyor which receives poultry from the tiltable conveyor and delivers the poultry to the depositing means, said conveyors being aligned end-to-end whereby captured poultry are conveyed from the capturing means to the depositing means.

21. A poultry harvester as set forth in claim 1 wherein said conveying means provides captured poultry to said depositing means and wherein said controlling means stops said conveying means for a predetermined period of time after the predetermined number of poultry are deposited in a compartment to permit said depositing means to move to another compartment within the cage.

22. A method for harvesting poultry from a generally horizontal plane, such as the floor of a poultry house, and transferring a predetermined number of captured poultry to a compartment of a cage having a plurality of compartments arranged in rows and columns, said method comprising the steps of:

capturing the poultry;

counting the captured poultry;

conveying the captured poultry to a depositing mechanism; and depositing by the depositing mechanism the predetermined number of conveyed poultry as counted by said counting step into each of the compartments in each row and in each column of the cage by relative movement between the depositing mechanism and the cage to deposit poultry into said plurality of compartments.

* * * * *